No. 865,237. PATENTED SEPT. 3, 1907.
S. & J. CHANDLER.
MECHANICAL DEVICE FOR ADVERTISING PURPOSES.
APPLICATION FILED DEC. 28, 1906.
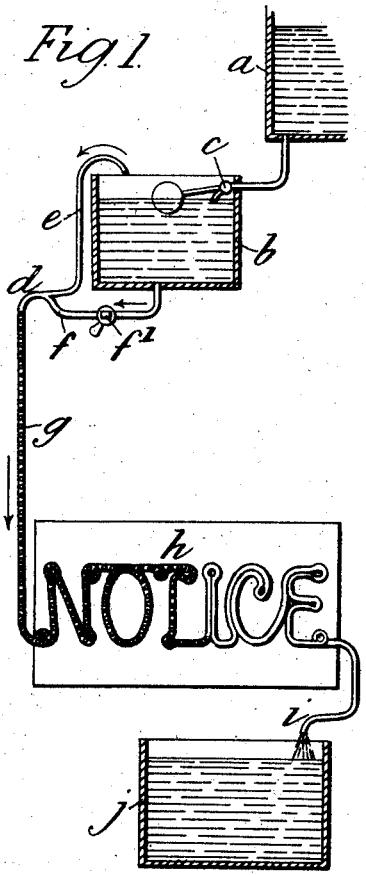
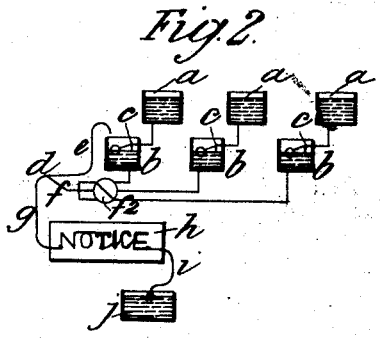
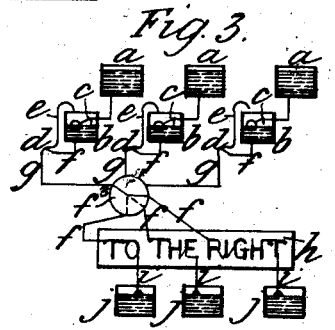

UNITED STATES PATENT OFFICE.

SAMUEL CHANDLER AND JOSIAH CHANDLER, OF WESTMINSTER, ENGLAND, ASSIGNORS TO LIVING LETTERS LIMITED, OF WESTMINSTER, LONDON CO., ENGLAND.

MECHANICAL DEVICE FOR ADVERTISING PURPOSES.

No. 865,237.      Specification of Letters Patent.      Patented Sept. 3, 1907.

Application filed December 28, 1906. Serial No. 349,875.

*To all whom it may concern:*

Be it known that we, SAMUEL CHANDLER and JOSIAH CHANDLER, both subjects of the King of Great Britain, residing at 39 Victoria street, Westminster, in the county of London, England, gas engineers, have invented certain new and useful Improvements in Mechanical Devices for Advertising Purposes, of which the following is a specification.

This invention relates to a mechanical device for displaying names, letters, trade marks, or other designs for advertising, spectacular or similar purposes, which consists in forming the design of a tube or series of tubes of glass or other transparent material and forcing air and water or other liquid through the tube or tubes in alternating columns or globules. It has been heretofore proposed to accomplish this by means of gravity or hydrostatic pressure only, using an aspirator or water pump contained in an open tank of the circulating liquid to produce the alternating columns of air and liquid, and regulating the flow thereof by varying the submerged opening through which the liquid is admitted to the aspirator tube.

The present invention relates to a simple and effective apparatus of this kind which is characterized chiefly by the provision made for regulating the flow of the fluids through the tube or tubes of the design, which consists first in maintaining a constant head of liquid in the open tank with which the aspirator is connected by means of a float valve controlling the flow of liquid into the tank, and thereby securing a constant effect in any part of the device, and in disposing the aspirator, which is constructed for working with small heads of water, outside the pressure tank, whereby the flow of the fluids may be controlled by means of a simple cock fitted in the tube connecting the aspirator with the tank.

The invention is illustrated in the accompanying drawings, in which

Figure 1 is a diagrammatic view of the device in which the design is displayed in one color; Fig. 2 an arrangement for displaying the design in different colors in rotation; Fig. 3 an arrangement for displaying different parts of the design in different colors at the same time; and Fig. 4 is a detail showing parts of the tubes of different bore so as to vary the length of the bubbles.

In the figures $a$ is a main supply tank for the liquid to be used; $b$ an intermediate secondary supply tank at a lower level provided with a float valve $c$ for maintaining a constant level of liquid in the tank $d$ an aspirator consisting of a pipe $e$ open to the air at a level higher than that of the liquid in the tank $b$, and a pipe $f$ leading from the said tank and connected in common with the pipe $e$ with the delivery pipe $g$. The pipe $f$ is preferably provided with a regulating cock $f'$ and joined to the pipe $e$ so as to make a small angle therewith. The delivery pipe leads downwardly to and is connected with the continuous series of tubes $h$ constituting the outline of the device to be displayed which terminates in a discharge pipe $i$ opening into a tank $j$ in which the liquid may be collected and from which it may be transferred by suitable means to the tank $a$ for future use.

The head of liquid is arranged to give a rapid flow through the device so that wide variations of the flow may be obtained by means of the regulating cock such as $f'$. The length of the air columns or bubbles and the rate of flow may also be varied in different parts of the device by such parts of tubes $h$ having different bores as in Fig. 4, but to produce a constant effect at any given part of the device it is necessary that a constant head of liquid should be maintained and it is for this reason that it is advisable to provide the tank $b$ with a float valve $c$.

The reflection and refraction of light at the moving surfaces of the globules and at the glass surfaces exhibit the design in a striking manner, and additional effects may be obtained by providing a number of tanks such as $a$ and $b$ containing different colored liquids as in Fig. 2, any one of which may be connected at will to the design to be displayed by means of a multiple way cock such as $f^2$ instead of a single way cock $f'$. Also the design may be constituted of a number of separate letters or parts, each having a separate inlet pipe as in Fig. 3, such as $f$ and these inlet pipes may be simultaneously connected in rotation with a corresponding number of supply tanks such as $f$ containing different colored liquids by means of a multiple commutating cock such as $f^3$ in place of the single way cock $f'$ having suitable connections to the tanks $b$ and the pipes $f$. In this case an aspirator would be required for each tank and pipe.

When colored liquid is made to follow water in the tubes of the design it is necessary to open the regulating cock wider if it is desired to maintain the same size of air bubbles and speed of transmission owing to the greater resistance offered to the transpiration of the colored liquid when such liquid is, as it usually would be, water containing some coloring matter in solution.

The light necessary for the proper display of the design may be provided artificially in any suitable manner as for example, by placing an electric or other suitable lamp or lamps in rear of the design. Some such arrangement would of course be necessary for night displays.

Having thus described the nature of our said invention and the best means we know of carrying the same into practical effect, we claim:—

1. A device for advertising, spectacular, or similar purposes, comprising a series of tubes of transparent material constituting the design to be displayed, a plurality of main supply tanks containing differently colored liquids, a corresponding number of open secondary supply tanks in connection with said main tanks each with each, float valves in said secondary tanks operating to maintain a constant level of liquid therein, an aspirator external to said secondary tanks and operated on by the pressure of the liquid therein to deliver alternating columns of liquid and air to the series of tubes, and a multiple way cock to admit liquid from any one of said secondary tanks to the said aspirator, substantially as described.

2. A device for advertising, spectacular, or similar purposes, comprising a plurality of tubes of transparent material constituting a design to be displayed, a plurality of main supply tanks containing differently colored liquids, a corresponding number of open secondary supply tanks in connection with said main tanks each with each for supplying differently colored liquids to different parts of the design, float valves in said secondary tanks operating to maintain a constant level of liquid therein, a plurality of aspirators external to said supply tanks, and operated on by the pressure of the liquid therein to deliver alternating columns of liquid and air to the said plurality of tubes, and a multiple commutating cock for regulating the supply of liquid to the said aspirators, substantially as described.

In testimony whereof we have signed our names to this specification in the presence of two subscribing witnesses.

SAMUEL CHANDLER.
JOSIAH CHANDLER.

Witnesses:
A. F. BADCOCK,
CHAS. W. CURELON.